(12) United States Patent
Tan et al.

(10) Patent No.: US 7,698,353 B2
(45) Date of Patent: Apr. 13, 2010

(54) FLOATING POINT NORMALIZATION AND DENORMALIZATION

(75) Inventors: Dimitri Tan, Austin, TX (US); Trinh H. Nguyen, Pflugerville, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 710 days.

(21) Appl. No.: 11/226,040

(22) Filed: Sep. 14, 2005

(65) Prior Publication Data

US 2007/0061391 A1    Mar. 15, 2007

(51) Int. Cl.
*G06F 7/00* (2006.01)

(52) U.S. Cl. ...................................... 708/205

(58) Field of Classification Search ......... 708/200–209, 708/495
See application file for complete search history.

(56) References Cited

U.S. PATENT DOCUMENTS

| | | | | |
|---|---|---|---|---|
| 4,926,369 | A | * | 5/1990 | Hokenek et al. ............. 708/205 |
| 5,058,048 | A | | 10/1991 | Gupta et al. |
| 5,267,186 | A | | 11/1993 | Gupta et al. |
| 5,392,228 | A | | 2/1995 | Burgess et al. |
| 5,493,520 | A | * | 2/1996 | Schmookler et al. ........ 708/211 |
| 5,513,362 | A | | 4/1996 | Urano et al. |
| 5,550,767 | A | | 8/1996 | Taborn et al. |
| 5,646,875 | A | | 7/1997 | Taborn et al. |
| 5,732,007 | A | | 3/1998 | Grushin et al. |
| 5,757,682 | A | * | 5/1998 | Schwarz et al. ............. 708/205 |
| 5,757,687 | A | | 5/1998 | Naffziger et al. |
| 5,764,549 | A | | 6/1998 | Bjorksten et al. |
| 5,903,479 | A | | 5/1999 | Schwarz et al. |
| 5,943,249 | A | | 8/1999 | Handlogten |
| 5,957,997 | A | * | 9/1999 | Olson et al. ................. 708/205 |
| 5,963,461 | A | | 10/1999 | Gorshtein et al. |
| 6,477,552 | B1 | * | 11/2002 | Ott ............................. 708/211 |
| 6,654,775 | B1 | | 11/2003 | Ott |
| 6,697,828 | B1 | * | 2/2004 | Ott ............................. 708/211 |

OTHER PUBLICATIONS

PCT/US06/34774 PCT Search Report with Written Opinion dated Jun. 6, 2007.
"IEEE Standard for Binary Floating Point Arithmetic", ANSI/IEEE Std. 754, 1985.

(Continued)

*Primary Examiner*—Chat C Do
(74) *Attorney, Agent, or Firm*—David G. Dolezal; Daniel D. Hill (57) ABSTRACT

A data processor includes a first bit field of a first plurality of bits representing a mantissa of a floating point number and a second bit field of a second plurality of bits representing an exponent of the floating point number. The first plurality of bits is partitioned into a plurality of regions, each of the plurality of regions comprises more than one bit of the first plurality of bits. A leading zero anticipator or other type of leading bit indication circuit is coupled to each region and determines a position of a leading bit of the first plurality of bits. A normalizer is coupled to receive a region of the plurality of regions that contains the leading bit, the normalizer may normalize or denormalize the region to produce a normalized or denormalized floating point number.

33 Claims, 4 Drawing Sheets

OTHER PUBLICATIONS

Hokenek et al, "Second Generation RISC Floating Point with Multiply-Add Fused", IEEE J. Solid-State Circuits, vol. 25, No. 5, pp. 1207-1213, Oct. 1990.

Jessani et al, "The Floating-Point Unit of the PowerPC 603e Microprocessor", IBM J. Res. Develop., vol. 40, No. 5, Sep 1996.

Jessani et al, "Comparison of Single and Dual Pass Multiply-Add Fused Floating-Point Units", IEEE Trans. Computers, vol. 47, No. 9, pp. 927-937, 1998.

Lang et al, "Floating-Point Fused Multiply-Add with Reduced Latency", IEEE Int. Conf. Computer Design-VLSI in Comp. and Processors (ICCD02), 2002.

Kershaw et al, "A Programmable Digital Signal Processor with 32-bit Floating Point Arithmetic", IEEE Solid State Circuits Conference, Digest of Papers, pp. 92-93, 1985.

Hokenek et al, "Leading-Zero Anticipator (LZA) in the IBM RISC System/6000 Floating-Point Execution Unit", IBM Journal of Research and Development, vol. 34-1, pp. 71-77, Jan 1990.

Schmookler et al, "Leading Zero Anticipation and Detection—A Comparison of Methods", Computer Arithmetic, 2001. Proceedings. 15 IEEE Symposium, pp. 7-12, Jun. 2001.

Schwarz et al, "Hardware Implementations of Denormalized Numbers", Computer Arithmetic, 2003. Proceedings. $16^{th}$ IEEE Symposium, pp. 70-78, Jun. 2003.

* cited by examiner

MUX INPUT 109

| | | |
|---|---|---|
| 0 : | 0's | N0 |
| 1 : | N0 | N1 |
| 2 : | N1 | N2 |
| 3 : | N2 | 0's |

FLOATING POINT NORMALIZATION AND DENORMALIZATION

BACKGROUND OF THE INVENTION

1. Field of the Invention

This invention relates in general to data processing systems and specifically to floating point units.

2. Description of the Related Art

Floating point units (FPUs) which execute floating point addition or floating point fused-multiply addition instructions may process a full-precision intermediate result in order to produce either a normalized result or a denormalized result in accordance with the IEEE 754 binary floating point standard. Normalization includes removing all non-significant bits (leading zeros) from the full-precision intermediate mantissa by left shifting and adjusting the exponent by subtracting the number of leading zeros removed. Denormalization may be required when the exponent of the normalized result is less than the minimum allowed exponent value $E_{min}$ and underflow is disabled. Denormalization may include prepending non-significant bits (leading zeros) to the full-precision intermediate mantissa by right shifting and adjusting the exponent by adding the number of leading zeros prepended to the mantissa until the exponent equals $E_{min}$. Thus, for both normalization and denormalization, the exponent is adjusted by subtracting the normalization/denormalization shift count which may be positive (indicating a left shift) or negative (indicating a right shift).

This normalization/denormalization processing may be performed by the normalizer. The full-precision intermediate result in FPUs is typically produced by a sign-magnitude carry propagate adder. In some FPUs, the adder and normalizer are contained in separate pipeline stages called the addition stage and normalize stage respectively. Furthermore, in some FPUs, the shift count for the normalizer is calculated in parallel with the adder in the addition stage with the use of a leading zero anticipator (LZA).

There are two main methods used in FPUs for normalizing or denormalizing a full-precision intermediate result. The first method is the "brute-force" method in which the LZA and normalizer are the full-width of the full-precision intermediate mantissa result. In this context, the "width" of the normalizer refers to the maximum shift that it can accommodate. The brute-force design can be fully pipelined, but for high speed designs the full-width normalizer may require two or more pipeline stages. To support denormalized results, the shift count must be limited or clamped prior to commencing the shift otherwise the design cannot be fully-pipelined without stalling. The major advantage of the brute-force method is that the design can be fully-pipelined without the need for any pipeline stalls. The major disadvantages of the brute-force method are the high area requirements of the full-width LZA and full-width normalizer and the increased delay through the normalization stage and LZA. The increased delay is equivalent to increased latency in a highly-pipelined, high-speed design.

The second method is the "iterative" method in which a reduced-width normalizer and LZA are used and the mantissa is fed through the normalizer a variable number of iterations depending on the position of the leading significant bit and depending on whether a normalized or denormalized result is required. This requires that the pipeline be stalled during the iterations. For normalization, the maximum number of iterations is given by the full-width of the un-normalized full-precision intermediate mantissa divided by the width of the normalizer. In this context, the "width" of the normalizer refers to the maximum shift that it can accommodate. The LZA determines the shift count for the first pass through the normalizer. A leading zero detector (LZD) in parallel with the normalizer is used to determine the shift count for subsequent iterations if they are required. To produce a denormalized result an additional pass through the normalizer can be used or the shift count can be clamped. The major advantages of the iterative method are the reduced area requirements and the reduced delay through the normalizer stage and LZA. The delay through the LZA is reduced since the LZA is a serial operation and therefore a reduction in width results in a reduction in delay. The major disadvantages are the need to iterate a variable number of times through the normalizer and the need to stall preceding pipeline stages if more than one pass through the normalizer is required.

Some designs have achieved denormalized results with the use of separate denormalization units. This requires even more hardware, complicates the instruction issuing and scheduling and has a detrimental impact on performance.

What is needed is an improved floating point unit.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting.

Some embodiments disclosed herein achieve normalization or denormalization in a single pass and a single pipeline cycle without stalling or incurring similar hardware costs of other methods. With some embodiments, a FPU breaks the full-precision intermediate mantissa into separate regions and computes the required left shift count for each region separately, while taking into account denormalization requirements. The region with the leading bit is then selected. In some embodiments, the normalizer required is only as wide as the widest region. In this context, the "width" of the normalizer refers to the maximum shift that it can accommodate. The number of regions and the width of each region are independent design parameters that can be varied based on technology and implementation constraints. With some embodiments, the normalizer shifter must support a maximum shift equal to the width of the widest region. At least some embodiments described herein combine the advantages of both the brute-force and iterative methods without the associated disadvantages.

Figure 1:
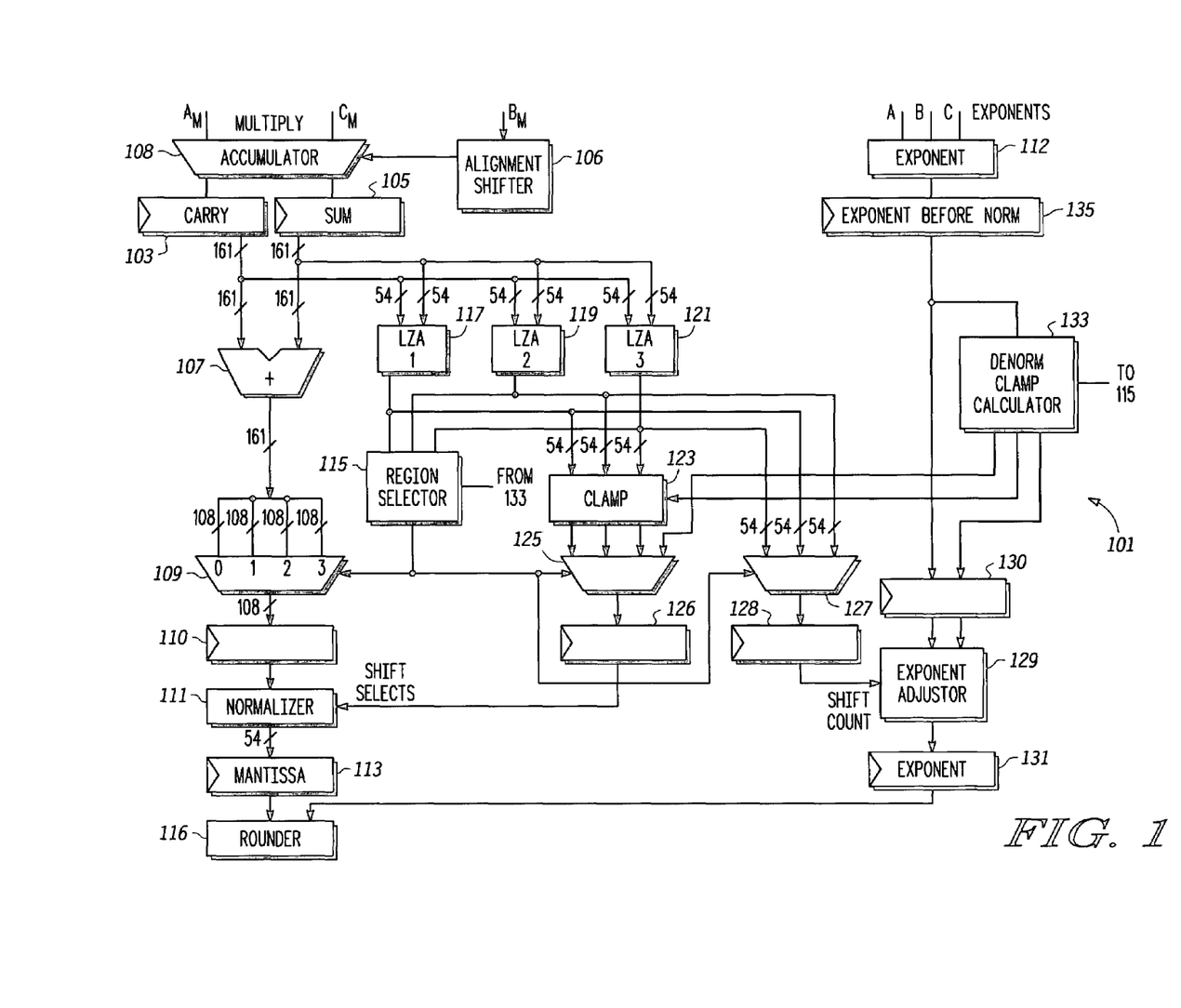
FIG. 1 is a block diagram of a floating point unit according to the present invention.

FIG. 1 is a block diagram of a floating point unit (FPU) 101 according to one embodiment of the present invention. In the embodiment shown, FPU 101 is a fused-multiply-add (FMA) FPU that is optimized to execute multiply-add instructions which take the form of A*C+B where A, B, and C are floating point numbers each having a sign, a mantissa, and an exponent.

In the embodiment shown, the mantissa of operands A ($A_m$) and C ($C_m$) are provided to multiplier/accumulator 108 from a dispatch unit (e.g. 520 of FIG. 5) of a data processing system. The mantissa of operand B ($B_m$) provided to alignment shifter 106. Alignment shifter 106 shifts the mantissa of operand B to align the mantissa of operand B such that the exponent of B equals the exponent of the multiplication of operand A and C. Multiplier/accumulator 108 outputs a full precision intermediate mantissa in redundant carry save format with carry portion provided to register 103 and the sum portion provided to sum register 105.

Figure 2:
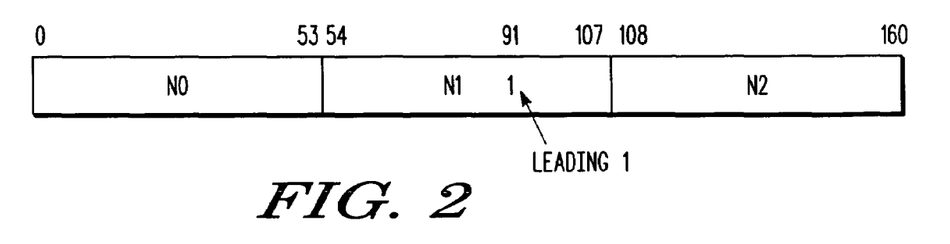
FIG. 2 is a block diagram illustrating the division of the intermediate mantissa into 3 regions according to one embodiment of the present invention.

FPU 101 partitions the full precision mantissa into a number of normalization regions (N0, N1, and N2, see FIG. 2). Leading zero anticipators (LZA) (LZA 117, LZA 119, and LZA 121) are leading bit indication circuits which are utilized for each region to determine the position of the leading bit. The embodiment shown, FPU 101 supports double-precision floating point operands and produces a full-precision intermediate mantissa before normalization that is 161 bits wide.

FPU 101 includes an adder 107 that adds the contents of register 103 and 105 together to form a 161 bit unnormalized resultant mantissa. In some embodiments, adder 107 is implemented with a 161 bit end around carry adder (also known as a modulo $2^{n-1}$ or ones complement adder). Furthermore, in some embodiments, adder 107 includes an inverter circuit to produce a sign-magnitude representation as opposed to a signed twos complement representation. Also in other embodiments, adder 107 includes an LZA error detector and a circuit for compensating for the potential one bit error introduced by using the B operand alignment shift count to obtain the normalization shift count. Alternatively the LZA error may be detected after the addition and in parallel with the normalizer 111 such that it can be used to correct the error at the end of the normalizer shift.

In the embodiment shown, FPU 101 includes three LZAs (117, 119, and 121). Each LZA circuit is provided with specific region of the redundant mantissa and is used to determine the position of the leading bit in those portions. LZA 117 receives the first normalization region of 54 bits (bits 0-53), LZA 119 receives a second normalization region of 54 (bits 54-107), and LZA circuit 121 receives a third normalization region of 53 bits (bits 108 to 161).

In other embodiments, other types of leading bit indication circuit may be used. For example, the leading one detection for region N0 may be performed by a decoder which examines the operand B alignment shift count (from shifter 106) to determine whether a leading one is located in region N0 and its location. An error detection circuit may also be utilized for compensating for a one bit error in utilizing the B alignment shift. With such embodiments, LZA 117 would be omitted.

Each LZA 117, 119, and 121 provides a single bit indication to region selector 115 which indicates whether a leading one was detected in the region. Each LZA circuit also provides a leading zero position indicator to clamp circuit 123. In the embodiment shown, each leading zeros position indicator is 54 bits wide and consists of a string of zeros followed by a string of ones where the first one indicates the position of the leading one in the region as determined by the LZA. Such a binary string is known as a monotonic string and exhibits the property that if a given bit is a one then all bits to the right will also be ones. The monotonic string also exhibits the dual property that states if a given bit is zero then all bits to the left will also be zeros. In some cases the monotonic string may consist of all ones, or alternatively, all zeros. In one embodiment, the single bit indication is the LSB of the 54 bit monotonic string. If the LSB of the 54 bit monotonic string is zero then the 54 bit region does not contain a leading one. If the LSB of the 54 bit monotonic string is one then a leading one is contained somewhere in the 54 bit region.

Selector 115 determines which region is provided to the normalizer 111 based on information from the LZA 117, LZA 119, LZA 121, and from the denorm clamp calculator 133. Selector 115 determines the location of the leading of one in the 161 bit intermediate mantissa based upon the values of the three leading indicator bits from LZA 117, LZA 119, and LZA 121. Selector 115 determines if a denormalization right shift is required based on the calculations made by the denorm clamp calculator 133. Based upon both of these determinations and whether the underflow exception is enabled for the instruction, selector 115 designates the 108 bits to be provided to normalizer 111 and the shift count to be provided to normalizer 111.

In the embodiment shown, the operations of FPU 101 are implemented in multiple successive pipelined stages. For example, the operations of multiply accumulator 108 and exponent circuit 112 are implemented in multiple pipeline stages. The results of these operations are latched in registers 103, 105, and 135. The operations of adder 107, LZA 117, LZA 119, and LZA 121, denorm clamp calculator 133, clamp circuit 123, region selector 115, and multiplexer circuits 109, 125, and 127 are performed in another pipelined stage. Accordingly registers 110, 126, 128 and 130 are utilized for latching the results of these operations of this stage.

The operations of normalizer 111 and exponent adjustor 129 are performed in another stage with the results of this stage latched in register 113 and exponent register 131. The operations of rounder 116 is performed in the last pipelined stage. Afterwards, the results of rounder 116 are written to a rename buffer (e.g. 537 of FIG. 5) and written back to the inputs of FPU 101.

FIG. 2 shows the division of the intermediate mantissa into regions N0, N1, and N2. The purpose of the normalizing operation is to remove the leading zeros from the intermediate mantissa. With a "brute force" method, a 161 bit shifter would be utilized to shift the leading 1 to position 0 (for a normalized result). However, a 161 bit shifter may require more levels of logic and is more complex than shifters of a lesser bit width. The number of bits to be shifted by normalizer 111 is 54 bits and is less than the width of the intermediate mantissa (161 bits). Therefore, the system advantageously reduces the number of bits needed to be shifted by normalizer 111, thereby reducing the complexity of normalizer 111, and reducing the amount of time needed for operation, and the circuit area of normalizer 111 and the registers feeding the normalizer 111.

For example, if the leading one is located at bit 91, then the bits of region N1 and N2 are provided to normalizer 111 (via multiplexer circuit 109 and register 110 as selected by selector 115). With the leading one located at bit position 91, there is no need to provide the bits from region N0 (all leading zeros) to normalizer 111.

Figure 3:
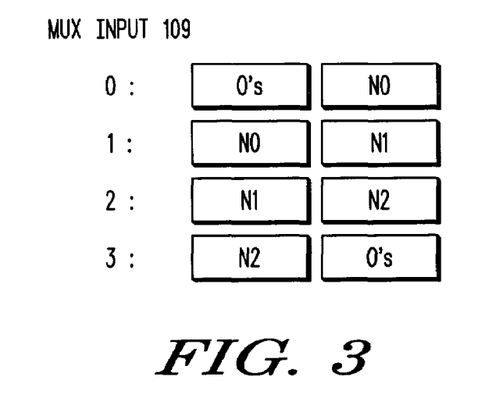
FIG. 3 is a table illustration of the values applied to an input of a multiplexer according to the present invention.

Referring to FIG. 3, each input of multiplexer circuit 109 is provided with 108 bits. As shown in FIG. 3, input 0 is provided with 54 zeros and the bits of region N0. Input 1 is provided with the bits of regions N0 and N1. Input 2 is provided with the bits of regions N1 and N2. Input 3 is provided with the bits of region N2 and 54 zeros.

For normalizations, if the leading one is found in region N0, then input 1 is selected and N0 and N1 are provided to normalizer 111. If the leading one determined to be in region N1, then input 2 is selected and regions N1 and N2 are provided to normalizer 111. If the leading one determined to be in region N2, then input 3 is selected and regions N2 and 54 zeros are provided to normalizer 111.

In the embodiment shown, FPU 101 may also perform denormalization operations. These denormalization operations include a denormalization right shift operation or a left shift operation that is less than the full normalization left shift. The denormalization operations are required when underflow is disabled and denormalized results are required as described in the IEEE 754 standard. Denormalized results are characterized by leading zeros in the mantissa with the exponent clamped at $E_{min}$ (the minimum allowed exponent accordingly to the IEEE 754 standard). This can be contrasted to normalized results which are characterized by a leading one in the most significant bit of the mantissa.

The denormalization right shift operation is used to bring the exponent back into range if the exponent is already less than $E_{min}$. In one embodiment, the denormalization right shift is actually a left shift with the assumption that the normalizer input data is first aligned 54 bits to the right. The purpose of aligning the data this way is to avoid implementing a shifter that can shift in both directions, that is, left and right. A unidirectional shifter is simpler and faster to implement than a bidirectional shifter. For a denormalization right shift operation, if the leading one is determined to be in region N0, then input 0 is selected and 54 zeros and N0 are provided to normalizer 111. If the leading one is determined to be in region N1, then input 1 is selected and regions N0 and N1 are provided to normalizer 11. In this case N0 would consist of all zeros since the leading one is in region N1. If the leading one is determined to be in region N2, then input 2 is selected and regions N1 and N2 are provided to normalizer 111. In this case N1 would consist of all zeros since the leading one is in region N2.

The denormalization left shift operation is applied when the full normalization left shift would cause the exponent to be fall below $E_{min}$. With these operations, the intermediate mantissa provided to normalizer 111 is shifted left until the exponent reaches $E_{min}$. In some embodiments, the denormalization left shift is achieved by clamping circuit 123 which limits the left shift such that the exponent is prevented from falling below $E_{min}$. In the present invention, the denorm clamp calculator 133 computes the clamp separately for each region N0, N1 and N2 and performs the computation independently of the full normalization left shift count that is computed by the LZA 117, LZA 119 and LZA 121.

In some embodiments, normalizer 111 supports a 54 bit left shift, accepts a 108bit input and produces a 54 bit output. Such a configuration can support both single-precision and double-precision floating-point operations. In other embodiments, normalizer 111 could be narrower or wider depending on the required precision of the data and the number of regions. Normalizer 111 can be implemented in a number of ways. In one embodiment, normalizer shifter 111 is implemented as a logarithmic multiplexer-based unidirectional left shifter with three stages. The first stage performs hexadecimal shifts of 0, 16, 32 or 48. The second stage performs quaternary shifts of 0, 4, 8, or 12. The third and final stage performs binary shifts of 0, 1, 2, 3, or 4. Due to the one bit inaccuracy in the LZAs used to calculate the normalization shift count, the last stage of the normalizer has an extra input. The binary shift (the last stage) may have a one bit error correction to account for the inherent LZA error. Alternatively, in other embodiments, a fourth stage, which performs binary shifts of 0 or 1, can be appended to accommodate the LZA error correction. Note that the input to the normalizer shifter is only 54+54 =108 bits wide where 54 is the maximum possible shift and 54 is the width of the data (53-bit mantissa+1 guard bit). The normalizer becomes successively narrower at each stage since the input data width is 108 bits but the output data width is only 54 bits. In some embodiments, sticky collection logic can be computed in parallel with the normalization shift using several different methods not discussed here. The output of normalizer 111 is provided to mantissa register 113. The output is the resultant mantissa which may be normalized or denormalized.

FPU 101 includes circuitry that clamps the normalization shift based upon whether a normalization shift would cause the exponent to fall below $E_{min}$ (the minimum allowed exponent accordingly to IEEE standard 754). Denorm clamp calculator 133 includes circuitry for comparing the intermediate exponent before normalization with $E_{min}$. In one embodiment, calculator 133 makes the following four calculations:

$$esemin = E_{b4norm} - E_{min} \quad (1)$$

$$esemins54 = E_{b4norm} - E_{min} - 54 \quad (2)$$

$$esemins108 = E_{b4norm} - E_{min} - 108 \quad (3)$$

$$eseminp54 = E_{b4norm} - E_{min} + 54 \quad (4)$$

where
$E_{b4norm}$=Intermediate Exponent Before Normalization
$E_{min}$=Minimum exponent=$-1022_{10}$ for Double-Precision, $-126_{10}$ for Single-Precision These calculations are utilized to derive the denormalization left shift clamps provided to clamp circuit 123 and the denormalization effective right shift count provided to multiplexer circuit 125. Each LZA region has a different left shift clamp. In one embodiment, the left shift clamp consists of a monotonic string that masks the monotonic string produced by the LZA for each region. The denormalization left shift clamp prevents the exponent from falling below $E_{min}$ by limiting the left shift amount. In one embodiment, esemin, esemins54, esemins108 and eseminp54 are signed twos complement binary numbers. The quantity esemin is used to create a shift clamp for region N0, quantity esemins54 is used to create a shift clamp for region N1, and quantity esemins108 is used to create a shift clamp for region N2. The quantities esemin, esemins54, and esemin108 are used to determine whether an effective right shift is to be performed. The indication to perform an effective right shift is provided to selector 115. The quantities esemins54, esemins108, and eseminp54 are used to determine the denormalization effective right shift counts. In one embodiment, one of these three values is selected based the signs of three numbers esemins54, esemin, and eseminp54. If esemin is negative and eseminp54 is positive, then eseminp54 is selected as the denormalization effective right shift count. If esemins54 is negative and esemin is positive, then esemin is selected as the denormalization effective right shift count. If eseminp54 is negative, then the denormalized mantissa will be all zeros and all significant bits will be shifted out to the right and can only contribute to the sticky calculation. If esemins54 is negative, then esemins54 is selected as the denormalization effective right shift count. In the embodiment shown, the values for the denormalization effective right shift count are provided to a count to shift (CTS) encoder at the input of multiplexer circuit 125 to convert the shift count to shift selects for the normalizer 111.

In some embodiments, circuitry of denorm clamp calculator 133 can be partially implemented before register 135. For example, the circuitry for performing the calculations of equations 1-4 above may be performed at that location. With these embodiments, the results would be latched in a register (not shown) before being provided to the circuitry of calculator 133 at its location shown in FIG. 1.

As stated earlier, selector 115 determines which region is provided to the normalizer 111 based on information from the LZA 117, LZA 119, LZA 121, and information from the denorm clamp calculator 133. Selector 115 determines the location of the leading of 1 in the 161 bit intermediate mantissa based upon the values of the three leading indicator bits from LZA 117, LZA 119, and LZA 121 as follows. If the LZA 117 leading bit indicator is a 1 then the leading 1 is in region N0. If the LZA 117 leading bit indicator is a 0 and the LZA 119 leading bit indicator is a 1 then the leading 1 is in region N1. If the LZA 117 and LZA 119 leading bit indicators are both 0s and the LZA 121 leading bit indicator is a 1 then the leading 1 is in region N2. Referring to FIG. 3, selector 115 must determine which 108 bits should be provided to normalizer 111. Input 0 of multiplexer circuit 109 is selected when the leading 1 is in region N0 and a denormalization right shift is required as indicated by a negative value for esemin and the underflow exception is not enabled. If the underflow exception is enabled, then the result is always normalized. Input 1 of multiplexer circuit 109 is selected under two separate conditions. The first condition that input 1 of multiplexer circuit 109 is selected is the left shift normalization/denormalization case and occurs when the leading one is in region N0 and esemin is positive or the underflow exception is enabled. The second condition that input 1 of multiplexer circuit 109 is selected is the right shift denormalization case and occurs when the leading 1 is in region N1 and esemins54 is negative and the underflow exception is disabled. Similarly, input 2 of multiplexer circuit 109 is selected under two separate conditions. The first condition that input 2 of multiplexer circuit 109 is selected is the left shift normalization/denormalization case and occurs when the leading 1 is in region N1 and esemins54 is positive or the underflow exception is enabled. The second condition that input 2 of multiplexer circuit 109 is selected is the right shift denormalization case and occurs when the leading 1 is in region N2 and esemins108 is negative and the underflow exception is disabled. Lastly, the input 3 of multiplexer circuit 109 is selected when the leading 1 is in region N2, esemins108 is positive, or the underflow exception is enabled and constitutes the left normalization/denormalization case. Note that in the context of region selection the left normalization/denormalization cases refer to the situations in which the exponent before normalization is greater than or equal to $E_{min}$, and therefore the mantissa can be left shifted. The left shift may be clamped to produce a denormalized result in the instances that the full normalization left shift would cause the exponent to fall below $E_{min}$. The right shift denormalization cases refer to situations in which the exponent before normalization is already less than $E_{min}$ and therefore an effective right shift is required. The result of such a right shift is of course a denormalized mantissa.

The multiplexer circuit 125 provides (via register 126) the shift selects to specify the shift amount to normalizer 111. In one embodiment, multiplexer circuit 125 includes decoder circuits which convert the monotonic strings to normalization shift selects. The amount specified by the shift selects equals the number of leading zeros in the monotonic string. The decoder exploits the dual properties of the monotonic string input, namely, if a bit in the monotonic string is a one then all bits to the right will also be ones, and similarly, if a bit in the monotonic string is a zero then all bits to the left will also be zeros. Therefore, only the zero to one transitions need to be examined, so each shift select signal can be expressed as a sum of products (SOP) with each product term consisting of the logical AND of two terms. Each shift select signal can be computed independently. The number of product terms in each shift select increases from the minimum case for the hexadecimal shift selects to the maximum case for the binary shift selects. Therefore, the hexadecimal shift selects can be computed faster than the quaternary or binary shift selects. In some embodiments, the decoder can be applied at the inputs to multiplexer circuit 125 or at the output of multiplexer circuit 125 depending on the critical speed path in the circuit. Furthermore, in some embodiments, the quaternary and binary shift select decoding can be deferred to the normalizer stage since the first stage of the normalizer 111 only requires the hexadecimal shift selects. Hence a portion of the quaternary shift selects decoding can be performed in parallel with the hexadecimal shift stage of normalizer 111. Similarly, a portion of the binary shift selects decoding can be performed in parallel with the hexadecimal and quaternary shift stages of normalizer 111.

In the embodiment shown, the multiplexer circuit 127 provides (via register 128) a binary shift count to exponent adjuster 129 to account for the normalization or denormalization shift performed by normalizer 111. The exponent adjuster 129 accounts for the normalization left shift by subtracting the shift amount from the exponent before normalization. In the case of a denormalization right shift or a denormalization left shift the exponent does not need to be computed since it is known to be $E_{min}$ by definition. The shift count is computed independently for each region N0, N1, and N2 by decoding the monotonic strings from the LZA 117, LZA 119 and LZA 121, respectively. It should be noted that the monotonic strings that are decoded have not been clamped since the effect of the full normalization on the exponent must be determined to properly detect underflow and overflow. In one embodiment, the region select signal is used to determine an amount to provide to the exponent adjuster 129 based on which region a leading one is detected. For example, if the leading one is detected in region N0, then the value that the exponent is adjusted would be the value of the output of multiplexer circuit 127. If the leading one is determined to be in region N1, then the value that the exponent is adjusted is would be the output of multiplexer circuit 127 plus 54. If the leading one is determined to be in region N2, then the value that the exponent is adjusted would be the output of multiplexer circuit 127 plus 108.

FPU 101 also includes an exponent computation circuit 112 which combines the exponents of the operands to obtain the exponent of the intermediate mantissa before normalization. This combination is dependent upon the instruction such that the exponent matches the alignment of the full precision intermediate exponent. The exponent of the full precision intermediate mantissa is provided to the register 135. The output of exponent adjustor 129 is provided to the exponent register 131 and represents the exponent of the result before rounding is applied. In the embodiment shown, the mantissa and exponent are provided to a rounder circuit for rounding the result. In some embodiments, the exponent adjuster 129 detects underflow and overflow. The constants +0, +54, +108 must be appropriately applied to the underflow and overflow detection in the same manner as the exponent adjustment.

Figure 4:
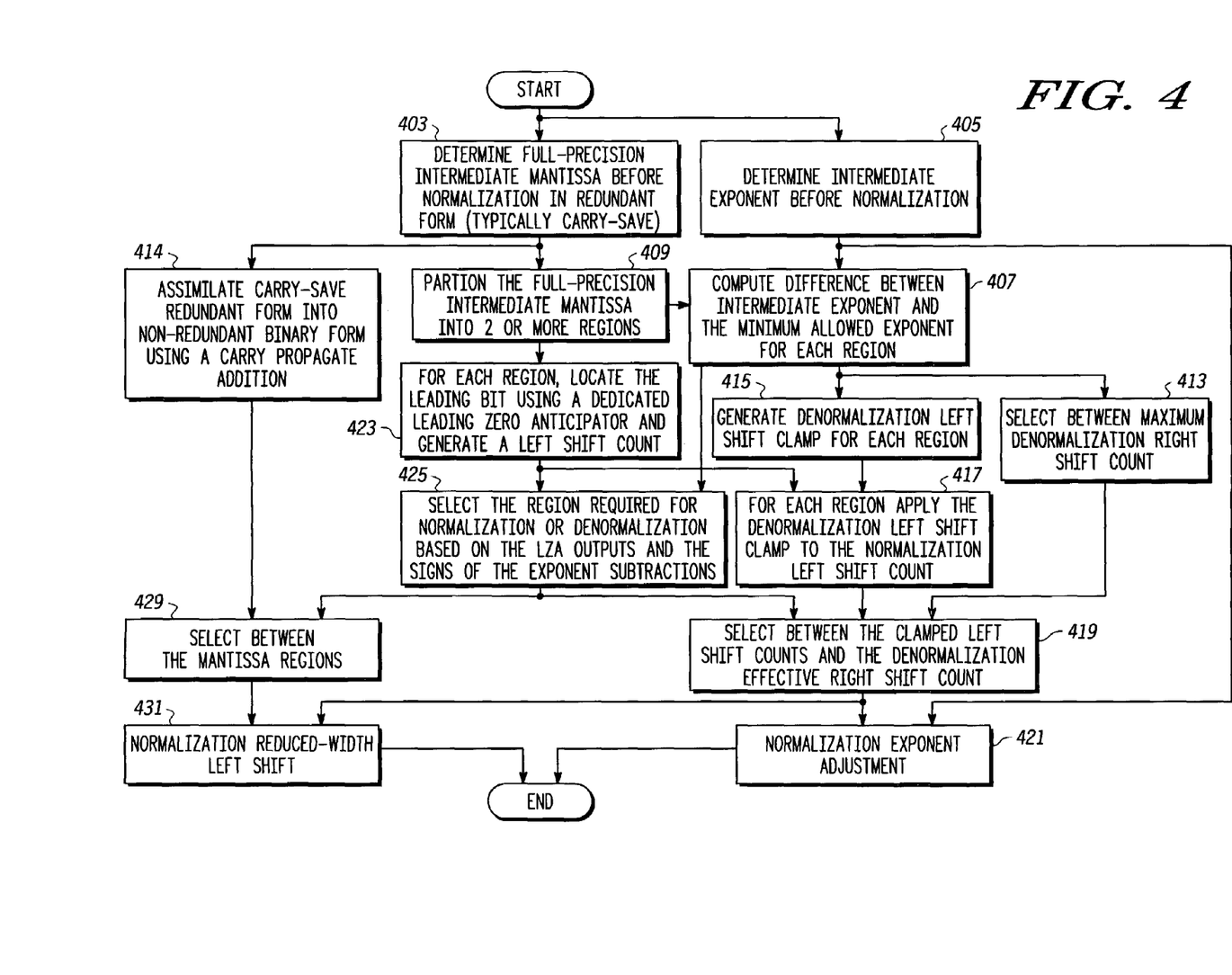
FIG. 4 is a method of operation of a floating point unit (FPU) according to one embodiment of the present invention.

FIG. 4 is a flow chart showing the operation of a floating point unit according to one embodiment of the present invention. In operation 403, accumulator 108 determines a full-precision intermediate mantissa before normalization in redundant form (in a carry save format) and provides the carry portion to carry register 103 and the sum portion to sum register 105. In operation 405, circuit 112 determines an intermediate exponent before normalization and provides the value to register 135.

In operation 414, adder 107 uses a carry propagate addition to assimilate the intermediate mantissa from a carry-save redundant representation to a non-redundant binary representation. In some embodiments, adder 107 may also invert the sum to produce a sign-magnitude intermediate mantissa instead of a signed twos complement intermediate mantissa.

In operation 409, the mantissa is partitioned into 2 or more regions. In the embodiment of FIG. 1, the mantissa is partitioned into 3 regions with the first region being provided to LZA 1, the second region being provided to LZA 2, and the third region being provided to LZA 3. In operation 423, for each region, the leading bit is located using a dedicated LZA (117, 119, and 121) and a left shift count is generated by decoding the output of the LZA. In FIG. 1, the decoding of the LZA output into a left shift count is preformed at the input to the multiplexer circuit 127 or alternatively, at the output of multiplexer circuit 127.

In operation 407, the difference between the intermediate exponent and the minimum allowed exponent $E_{min}$ is computed for each region by denorm clamp calculator 133. In one embodiment, the differences are represented by the signed twos complement numbers esemin, esemins54, esemins108 and eseminp54. In general, the number of differences that need to be computed equals the number of regions plus one.

In operation 415, a denormalization left shift clamp is generated for each region by decoding the binary numbers (esemin, esemin54, esemin108) computed in operation 407. In the embodiment of FIG. 1, denorm clamp calculator 133 performs the decoding of the binary numbers (esemin, esemin54, esemin108) to produce the denormalization left shift clamps.

In operation 413, denorm clamp calculator 133 selects between the denormalization right shift counts for each region by examining the signs of the signed quantities esemin, esemins54 and esemins108. If esemin is negative then eseminp54 is selected as the denormalization right shift count. If esemin is positive and esemins54 is negative, then esemin is selected as the denormalization right shift count. If esemin and esemins54 are negative and esemins108 is positive, then esemins54 is selected as the denormalization right shift count. If eseminp54 is negative then the denormalized mantissa will be all zeros and all significant bits will be shifted out to the right and can only contribute to the sticky calculation.

In operation 417, the denormalization left shift clamp is applied to the normalization left shift count for each region by clamp circuit 123 in FIG. 1. In one embodiment, for each region, the output of the LZA and the denormalization left shift clamp are in the form of monotonic strings described earlier. In such an embodiment, the clamp circuit 123 consists of the logical OR between the LZA monotonic string and the denormalization left shift clamp monotonic string. The number of leading zeros that are present in the monotonic string specify the number of leading zeros (or sign bits) to be removed from the selected region of the full precision intermediate mantissa that is presented to the normalizer 111. Therefore, if the clamp monotonic string has less leading zeros than the LZA monotonic string, then the monotonic string produced by the clamp circuit 123 will have the lesser of the number of leading zeros as the LZA monotonic string or the clamp monotonic string.

In operation 425, the region required for normalization or denormalization is selected based on the location of the leading bit for each region and the signs of the exponent subtractions esemin, esemins54, and esemins108. In the embodiment FPU 101, this determination is performed by the region selector 115.

In operation 429, the mantissa regions to be provided to normalizer 111 are selected by region selector 115. See the text above with respect to the discussion of FIG. 3.

In operation 419, multiplexer circuit 125 selects between the clamped left shift counts and the denormalization effective right shift count to determine the amount to left shift the portion of the intermediate full-precision mantissa supplied to normalizer 111 by multiplexer circuit 109 via register 110. The left shift counts are decoded into shift selects to control the shifting of the normalizer 111. Furthermore, in operation 419, multiplexer circuit 127 selects between the unclamped left shift counts provided by LZA 117, LZA 119 and LZA 121 and supplies (via register 128) the resultant shift count to the exponent adjuster 129.

In operation 431, the normalizer 111 shifts the selected regions by the shift operation determined in operation 419 to produce the normalized mantissa. The normalized mantissa is provided to mantissa register 113. In operation 421, the exponent adjuster 129 adjusts the exponent before normalization by subtracting the left shift amount and adding a constant. In one embodiment, the constant is 0 for region N0, −54 for region N1, −108 for region N2. In the case the resultant mantissa is denormalized and underflow exception is disabled, the resultant exponent is Emin. In the case where exponent underflow occurs and the underflow exception is enabled, the exponent is further adjusted by adding a constant of +192 for single precision and +1536 for double precision. The resultant exponent value is provided to exponent register 131.

Figure 5:
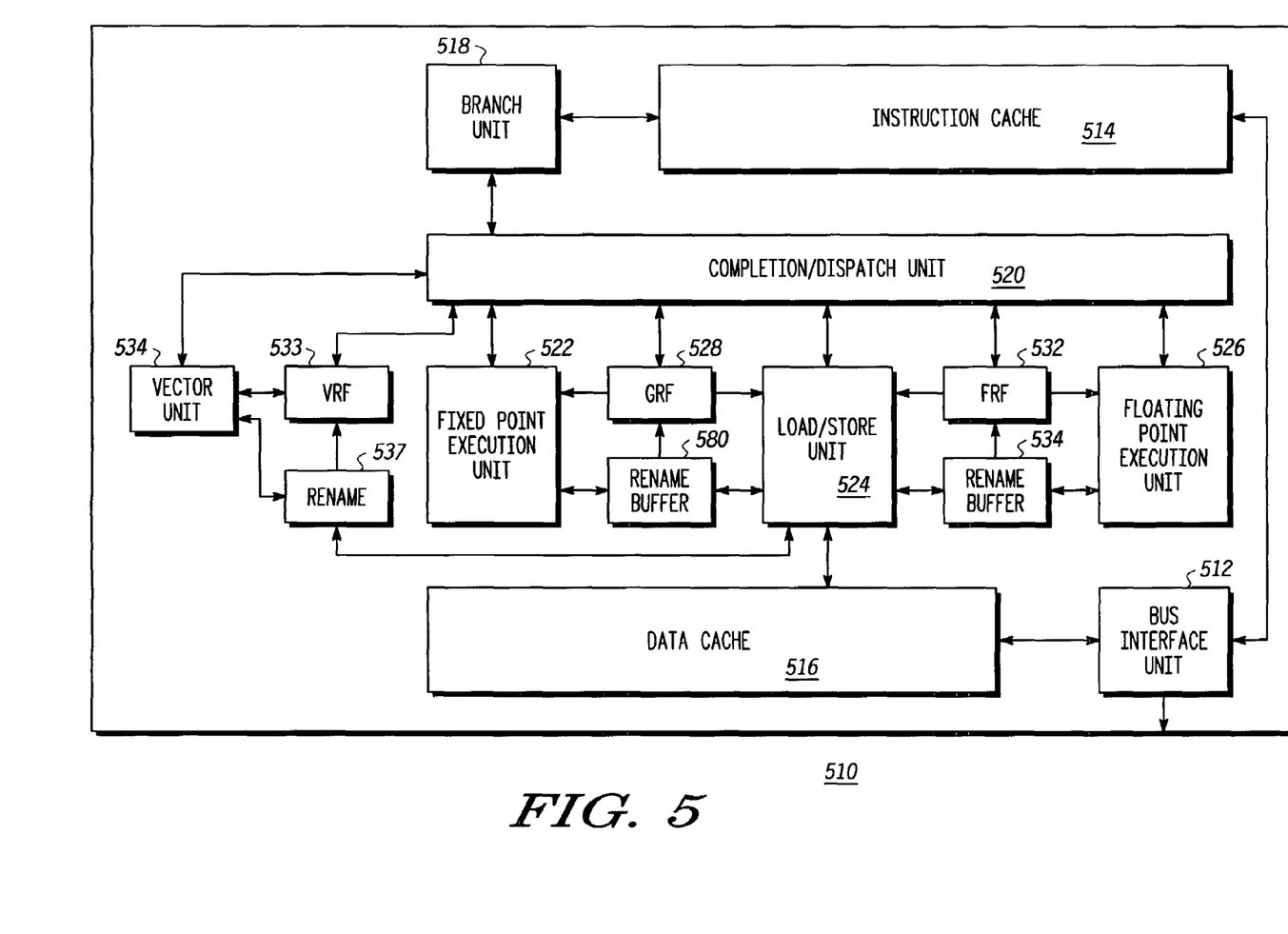
FIG. 5 is a block diagram of one embodiment of a data processing system according to one embodiment of the present invention.

FIG. 5 depicts a block diagram of a data processor 510. Data processor 510 includes a floating point unit 526 similar to floating point unit 101 of FIG. 1. Data processor may be a CPU, DSP, or other type of processing device. In one embodiment, the components of data processor 510 are implemented in an integrated circuit. In one embodiment, processor 510 implements a data processing pipeline.

A bus interface unit (BIU) 512 controls the flow of data between data processor 510 and the remainder of an electronic system (not shown) in which data processor 510 is incorporated. BIU 512 is operably coupled to an instruction cache 514 and to a data cache 516. Instruction cache 514 supplies an instruction stream to a branch unit 518 and to a completion/dispatch unit 520. Completion/dispatch unit 520 forwards individual instructions to an appropriate execution unit.

In the embodiment shown, data processor 510 has a fixed point execution unit 522, a load/store execution unit 524, a floating point execution unit 526, and a vector unit 534. Fixed point execution unit 522 and load/store execution unit 524 read and write their results to a general purpose architectural register file (GRF) 528, and to a rename buffer 530. Floating point execution unit 526 and load/store execution unit 524 read and write their results to a floating point architectural register file (FRF) 532, and to a rename buffer 537. Vector unit 534 and load/store execution unit 524 read and write their results to a vector architectural register file (VRF) 533, and to a rename buffer 537.

In some embodiments, branch unit 518 determines what sequence of programmed instructions is appropriate given the contents of certain data registers and the program steps themselves. Completion/dispatch unit 520 issues the individual instructions to the various execution units 522, 524 and 526. Each of the execution units performs one or more instructions of a particular class of instructions. The particular class of instructions of each execution unit is indicated by the name of the execution unit. For instance, floating point execution unit 526 manipulates data represented in floating point format.

In one embodiment, fixed point execution unit 522 returns the results of its operations to designated entries in rename buffer 530. Rename buffer 530 periodically updates an entry of GPR file 528 with an entry from rename buffer 530 when all instructions preceding the instruction that generated the result have updated their GPR file entries. Completion/dispatch unit 520 coordinates this updating. Both rename buffer 530 and GPR file 528 can supply operands to fixed point execution unit 522. Conversely, floating point execution unit 526 returns the results of its operations to designated entries in rename buffer 537. Rename buffer 537 periodically updates an entry of FPR file 532 with an entry in rename buffer 537 when all instructions preceding the instruction that generated the result have updated their FPR file entries. Completion/dispatch unit 520 also coordinates this updating. Both rename buffer 537 and FPR file 532 supply operands to floating point execution unit 526.

Some embodiments set forth above (e.g. FPU 101) perform both normalization operations and denormalization operations. However, other embodiments may only perform normalization operations, while still other embodiments may only perform denormalization operations. In addition, other embodiments may include different circuitry and/or utilize different techniques for performing normalization operations from that which performs denormalization operations. It is understood that embodiments characterized as "performing one of normalizing the selected region to produce a normalized floating point number or denormalizing the selected region to produce a denormalized floating point number" include those embodiments that perform only normalizing operations (and not denormalizing operations) of the selected regions, those embodiments that perform only denormalizing operations (and not normalizing operations) of the selected regions, and those embodiments that perform both normalizing operations and denormalizing operations of the selected regions (e.g. FPU 101).

In one embodiment, a method includes receiving a mantissa and an exponent of a floating point number. The mantissa is represented by a first plurality of bits and the exponent is represented by a second plurality of bits. The method includes partitioning the first plurality of bits into a plurality of regions, separately examining each of the plurality of regions for determining a position of a leading bit of the first plurality of bits, selecting a region of the plurality of regions based on the separately examining each of the plurality of regions, and performing one of normalizing the selected region to produce a normalized floating point number or denormalizing the selected region to produce a denormalized floating point number.

In a further embodiment, the selecting a region further includes selecting an adjacent region of the plurality of regions based on the separately examining, and the normalizing further includes normalizing the selected region and the adjacent region to produce a normalized floating point number. In a further embodiment, the selecting a region of the plurality of regions further includes selecting the region based on an indication of a leading bit in each of the regions of the plurality of regions and differences between the exponent and a predetermined value for each region of the plurality of regions. In a further embodiment, the separately examining further includes separately examining each of the plurality of regions in a redundant format. The method further includes compressing the first plurality of bits into a non redundant format, wherein the normalizing further includes normalizing the selected region in a non redundant format. In a further embodiment, the separately examining each of the plurality of regions includes examining at least one of the plurality of regions using a leading zero anticipator. In a further embodiment, the separately examining each of the plurality of regions includes examining each of the plurality of regions concurrently. In a further embodiment, the method is executed in a floating point unit of a data processing system. In a further embodiment, the leading bit represents a first non sign bit. In a further embodiment, the method includes for each region of the plurality of regions, determining a difference between the exponent and a predetermined value associated with the each region of the plurality of regions. The selecting a region is based on the determined differences. In a further embodiment, the method includes for each region of the plurality of regions, determining a difference between the exponent and a predetermined value associated with the each region of the plurality of regions. If the exponent is greater than or equal to the predetermined value associated with the selected region, the method includes comparing the difference between the exponent and the predetermined value associated with the selected region to a position of the leading bit of the selected region, and if the difference between the exponent and the predetermined value associated with the selected region is greater than or equal to the position, selecting the position as a shift count for the selected region, left shifting the selected region by the shift count to produce a normalized mantissa of the floating point number, and adjusting the exponent by the shift count to produce an adjusted exponent for the normalized floating point number. In a further embodiment, the method further includes if the difference between the exponent and the predetermined value associated with the selected region is less than the position, selecting the difference as a shift count for the selected region, and left shifting the selected region by the shift count to produce a denormalized mantissa of the floating point number. In a further embodiment, the performing one of normalizing the selected region to produce a normalized floating point number or denormalizing the selected region to produce a denormalized floating point number further includes performing the normalizing the selected region to produce a normalized floating point number. In a further embodiment, the performing one of normalizing the selected region to produce a normalized floating point number or denormalizing the selected region to produce a denormalized floating point number further includes performing the denormalizing the selected region to produce a denormalized floating point number. In a further embodiment, the normalizing the selected region to produce a normalized floating point number includes normalizing less than all of the regions of the plurality of regions.

In another embodiment, a data processing system includes a first bit field for including a first plurality of bits representing a mantissa of a floating point number and a second bit field for including a second plurality of bits representing an exponent of the floating point number. The first plurality of bits is partitioned into a plurality of regions. Each of the plurality of regions including more than one bit of the first plurality of bits. The data processing system also includes a plurality of leading bit indication circuits. Each of the plurality of leading bit indication circuits is coupled to receive a region of the plurality of regions for providing an indication regarding a leading bit. The data processing system also includes selection circuitry coupled to the plurality of leading bit indication circuits, the selection circuitry providing a selected region of the plurality of regions based upon the indications of the plurality of leading bit indication circuits. The data processing system also includes a normalizer coupled to receive the selected region, the normalizer normalizing the selected region to produce a normalized floating point number. In a further embodiment, the normalizer is capable of denormalizing the selected region to produce a denormalized floating point number. In a further embodiment, the plurality of leading bit indication circuits includes at least one leading zero anticipator. In a further embodiment, the method further includes a denormalization clamp calculator. The denormalization clamp calculator is coupled to receive the exponent and for determining how far the mantissa is to be shifted. In a further embodiment, the selection circuitry further includes a region selector, coupled to each of the plurality of leading bit indication circuits, for determining which region of the plurality of regions contains the leading bit. The selection circuitry further includes a multiplexer having a plurality of inputs for receiving the plurality of regions, a control input coupled to an output of the region selector, and an output for providing the selected region. In a further embodiment, the data processing system further includes an exponent adjustor having a first input coupled to the second bit field for receiving the plurality of bits representing the exponent, a second input coupled to receive a shift count signal, and an output for providing an adjusted exponent for an adjusted floating point number. In a further embodiment, the first plurality of bits is a full-precision mantissa in redundant form, wherein the selection circuitry provides the selected region in non redundant form.

In another embodiment, a method includes receiving a mantissa and an exponent of a floating point number. The mantissa is represented by a first plurality of bits and the exponent is represented by a second plurality of bits. The method further includes partitioning the first plurality of bits into a plurality of regions. Each of the plurality of regions including at least two bits. The method also includes separately examining each of the plurality of regions for determining a position of a leading bit of the first plurality of bits. The method still further includes for each region of the plurality of regions, determining a difference between the exponent and a predetermined value associated with the each region of the plurality of regions. The method further includes selecting a region of the plurality of regions based on the position of the leading bit and the differences determined for each region, normalizing or denormalizing the selected region depending upon the difference determined of the selected region, and adjusting the exponent to produce an adjusted exponent.

In a further embodiment, the method includes if the exponent is greater than or equal to the predetermined value for the selected region, comparing the difference between the exponent and the predetermined value associated with the selected region to a position of the leading bit of the selected region. The method further includes if the difference between the exponent and the predetermined value associated with the selected region is greater than or equal to the position, selecting the position as a shift count for the selected region, and left shifting the selected region by the shift count to produce a normalized mantissa of the floating point number. If the difference between the exponent and the predetermined value associated with the selected region is less than the position, the method includes selecting the difference as a shift count for the selected region and left shifting the selected region by the shift count to produce a denormalized mantissa of the floating point number. If the exponent is less than the predetermined value associated with the selected region, the method includes adjusting the selected region by a predetermined amount to the right, generating an adjusted shift count, and left shifting the selected region by the adjusted shift count to produce a denormalized mantissa of the floating point number.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

The invention claimed is:

1. A method performed by a data processing system implemented in circuitry, the method comprising:
   receiving a mantissa and an exponent of a floating point number, the mantissa represented by a first plurality of bits and the exponent represented by a second plurality of bits;
   partitioning the first plurality of bits into a plurality of regions;
   separately examining each of the plurality of regions for determining a position of a leading bit of the first plurality of bits, wherein the separately examining includes separately examining each of the plurality of regions for determining a position of a leading bit of the each region;
   selecting a region of the plurality of regions based on the separately examining each of the plurality of regions; and
   performing one of normalizing the selected region to produce a normalized floating point number or denormalizing the selected region to produce a denormalized floating point number, wherein the performing one of normalizing the selected region or denormalizing the selected region includes shifting a second plurality of bits including the selected region, wherein the second plurality of bits is less than the first plurality of bits.

2. The method of claim 1 wherein:
   the selecting a region further comprises selecting an adjacent region of the plurality of regions based on the separately examining;
   the normalizing further comprises normalizing the selected region and the adjacent region to produce a normalized floating point number.

3. The method of claim 1 wherein the selecting a region of the plurality of regions further includes selecting the region based on an indication of a leading bit in each of the regions of the plurality of regions and differences between the exponent and a predetermined value for each region of the plurality of regions.

4. The method of claim 1 wherein the separately examining further includes separately examining each of the plurality of regions in a redundant format, the method further comprising:
   compressing the first plurality of bits into a non redundant format, wherein the normalizing further includes normalizing the selected region in a non redundant format.

5. The method of claim 1, wherein the separately examining each of the plurality of regions comprises examining at least one of the plurality of regions using a leading zero anticipator.

6. The method of claim 1, wherein the separately examining each of the plurality of regions comprises examining each of the plurality of regions concurrently.

7. The method of claim 1, wherein the method is executed in a floating point unit of a data processing system.

8. The method of claim 1, wherein the leading bit represents a first non sign bit.

9. The method of claim 1, further comprising:
for each region of the plurality of regions, determining a difference between the exponent and a predetermined value associated with the each region of the plurality of regions;
wherein the selecting a region is based on the determined differences.

10. The method of claim 1, further comprising:
for each region of the plurality of regions, determining a difference between the exponent and a predetermined value associated with the each region of the plurality of regions;
if the exponent is greater than or equal to the predetermined value associated with the selected region:
comparing the difference between the exponent and the predetermined value associated with the selected region to a position of the leading bit of the selected region; and
if the difference between the exponent and the predetermined value associated with the selected region is greater than or equal to the position, selecting the position as a shift count for the selected region, left shifting the selected region by the shift count to produce a normalized mantissa of the floating point number, and adjusting the exponent by the shift count to produce an adjusted exponent for the normalized floating point number.

11. The method claim 10 further comprising:
if the difference between the exponent and the predetermined value associated with the selected region is less than the position:
selecting the difference as a shift count for the selected region; and
left shifting the selected region by the shift count to produce a denormalized mantissa of the floating point number.

12. The method of claim 1 wherein the performing one of normalizing the selected region to produce a normalized floating point number or denormalizing the selected region to produce a denormalized floating point number further includes performing the normalizing the selected region to produce a normalized floating point number.

13. The method of claim 1 wherein the performing one of normalizing the selected region to produce a normalized floating point number or denormalizing the selected region to produce a denormalized floating point number further includes performing the denormalizing the selected region to produce a denormalized floating point number.

14. The method of claim 1 wherein the normalizing the selected region to produce a normalized floating point number includes normalizing less than all of the regions of the plurality of regions.

15. The method of claim 1, further comprising:
for each region of the plurality of regions, determining a difference between the exponent and a predetermined value associated with the each region of the plurality of regions;
if the exponent is less than the predetermined value associated with the selected region:
adjusting the selected region by a predetermined amount to the right;
generating an adjusted shift count;
left shifting the selected region by the adjusted shift count to produce a denormalized mantissa of the floating point number; and
adjusting the exponent by the adjusted shift count to produce an adjusted exponent for the denormalized mantissa of the floating point number.

16. The method of claim 1 wherein:
the performing one of normalizing the selected region to produce a normalized floating point number or denormalizing the selected region to produce a denormalized floating point number further includes performing the normalizing the selected region to produce a normalized floating point number;
the performing the normalizing the selected region includes shifting the second plurality of bits including the selected region to produce a normalized mantissa.

17. The method of claim 1 wherein:
the performing one of normalizing the selected region to produce a normalized floating point number or denormalizing the selected region to produce a denormalized floating point number further includes performing the normalizing the selected region to produce a normalized floating point number;
the performing the normalizing the selected region includes shifting a the second plurality of bits including the selected region to a normalized position, wherein the second plurality of bits does not include all regions of the plurality of regions.

18. The method of claim 1 wherein:
the performing one of normalizing the selected region to produce a normalized floating point number or denormalizing the selected region to produce a denormalized floating point number further includes performing the normalizing the selected region to produce a normalized floating point number;
the selecting a region includes leaving at least one region of the plurality of regions unselected;
the performing the normalizing the selected region includes shifting the a second plurality of bits including the selected region, wherein an unselected region is not shifted.

19. The method of claim 1, wherein the selecting a region includes leaving at least one region of the plurality of regions unselected, wherein the shifting the second plurality of bits includes not shifting an unselected region.

20. A data processing system comprising:
a first bit field for including a first plurality of bits representing a mantissa of a floating point number and a second bit field for including a second plurality of bits representing an exponent of the floating point number, the first plurality of bits partitioned into a plurality of regions, each of the plurality of regions comprising more than one bit of the first plurality of bits;
a plurality of leading bit indication circuits, each of the plurality of leading bit indication circuits is coupled to receive a region of the plurality of regions, each of the plurality of leading bit indication circuits is configured to examine the received region to determine a position of a leading bit of the received region and for providing an indication regarding a leading bit;
selection circuitry coupled to the plurality of leading bit indication circuits, the selection circuitry providing a selected region of the plurality of regions based upon the indications of the plurality of leading bit indication circuits;
a normalizer, coupled to receive the selected region, the normalizer normalizing the selected region to produce a normalized floating point number;

wherein the normalizer includes a shifting circuitry that shifts a second plurality of bits including the selected region to produce a normalized mantissa of a normalized floating point number;

wherein the second plurality of bits is less than the first plurality of bits.

21. The data processing system of claim 20 wherein the normalizer is capable of denormalizing the selected region to produce a denormalized floating point number.

22. The data processing system of claim 20 wherein the plurality of leading bit indication circuits includes at least one leading zero anticipator.

23. The data processing system of claim 20, further comprising a denormalization clamp calculator, the denormalization clamp calculator coupled to receive the exponent and for determining how far the mantissa is to be shifted.

24. The data processing system of claim 20, wherein the selection circuitry further comprising:
a region selector, coupled to each of the plurality of leading bit indication circuits, for determining which region of the plurality of regions contains the leading bit; and
a multiplexer having a plurality of inputs for receiving the plurality of regions, a control input coupled to an output of the region selector, and an output for providing the selected region.

25. The data processing system of claim 20, further comprising an exponent adjustor having a first input coupled to the second bit field for receiving the second plurality of bits representing the exponent, a second input coupled to receive a shift count signal, and an output for providing an adjusted exponent for an adjusted floating point number.

26. The data processing system of claim 20, wherein the first plurality of bits is a full-precision mantissa in redundant form, wherein the selection circuitry provides the selected region in non redundant form.

27. The data processing system of claim 20 wherein the selection circuitry provides less than all of the regions to the normalizer, wherein the normalizer produces a normalized floating point number from less than all of the regions.

28. A method performed by a data processing system implemented in circuitry, the method comprising:
receiving a mantissa and an exponent of a floating point number, the mantissa represented by a first plurality of bits and the exponent represented by a second plurality of bits;
partitioning the first plurality of bits into a plurality of regions, each of the plurality of regions comprising at least two bits;
separately examining each of the plurality of regions for determining a position of a leading bit of the first plurality of bits wherein the separately examining includes separately examining each of the plurality of regions for determining a position of a leading bit of the each region;
for each region of the plurality of regions, determining a difference between the exponent and a predetermined value associated with the each region of the plurality of regions;
selecting a region of the plurality of regions based on the position of the leading bit and the differences determined for each region; and
normalizing or denormalizing the selected region depending upon the difference determined of the selected region, wherein the performing normalizing or denormalizing the selected region includes shifting a second plurality of bits including the selected region, wherein the second plurality of bits is less than the first plurality of bits;
adjusting the exponent to produce an adjusted exponent.

29. The method of claim 28, further comprising:
if the exponent is greater than or equal to the predetermined value for the selected region, comparing the difference between the exponent and the predetermined value associated with the selected region to a position of the leading bit of the selected region;
if the difference between the exponent and the predetermined value associated with the selected region is greater than or equal to the position:
selecting the position as a shift count for the selected region;
left shifting the selected region by the shift count to produce a normalized mantissa of the floating point number;
if the difference between the exponent and the predetermined value associated with the selected region is less than the position:
selecting the difference as a shift count for the selected region; and
left shifting the selected region by the shift count to produce a denormalized mantissa of the floating point number;
if the exponent is less than the predetermined value associated with the selected region:
adjusting the selected region by a predetermined amount to the right;
generating an adjusted shift count; and
left shifting the selected region by the adjusted shift count to produce a denormalized mantissa of the floating point number.

30. The method of claim 28 wherein:
the performing normalizing or denormalizing the selected region further includes performing the normalizing the selected region to produce a normalized floating point number;
the performing the normalizing the selected region includes shifting the second plurality of bits including the selected region to produce a normalized mantissa.

31. The method of claim 28 wherein:
the performing normalizing or denormalizing the selected region further includes performing the normalizing the selected region to produce a normalized floating point number;
the performing the normalizing the selected region includes shifting the second plurality of bits including the selected region to a normalized position, wherein the second plurality of bits does not include all regions of the plurality of regions.

32. The method of claim 28 wherein:
the selecting a region includes leaving at least one region of the plurality of regions unselected;
the performing normalizing or denormalizing the selected region includes shifting a second plurality of bits including the selected region, wherein an unselected region is not shifted.

33. The method of claim 32 the performing normalizing or denormalizing the selected region further includes performing the normalizing the selected region, the performing the normalizing the selected region includes shifting the second plurality of bits including the selected region to a normalized position.

* * * * *